US012047750B2

(12) United States Patent
Gandhi et al.

(10) Patent No.: US 12,047,750 B2
(45) **Date of Patent: *Jul. 23, 2024**

(54) HEARING DEVICE WITH USER DRIVEN SETTINGS ADJUSTMENT

(71) Applicant: Starkey Laboratories, Inc., Eden Prairie, MN (US)

(72) Inventors: Swapan Gandhi, El Cerrito, CA (US); Karrie LaRae Recker, Edina, MN (US); Donald James Reynolds, Pacifica, CA (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,183

(22) Filed: Apr. 12, 2023

(65) Prior Publication Data

US 2023/0396944 A1 Dec. 7, 2023

Related U.S. Application Data

(63) Continuation of application No. 17/249,244, filed on Feb. 24, 2021, now Pat. No. 11,641,556, which is a (Continued)

(51) Int. Cl.
*H04R 25/00* (2006.01)

(52) U.S. Cl.
CPC ........... *H04R 25/70* (2013.01); *H04R 25/305* (2013.01); *H04R 2225/41* (2013.01); *H04R 2225/55* (2013.01); *H04R 2460/07* (2013.01)

(58) Field of Classification Search
CPC H04R 2225/41; H04R 25/505; H04R 25/554; H04R 25/70; H04R 25/305; H04R 25/552; H04R 2225/43; H04R 2225/61; H04R 25/356; H04R 2225/021; H04R 2225/33; H04R 2225/55; H04R 2420/07; H04R 2460/03; H04R 2460/07; H04R 25/43; H04R 25/453; H04R 25/604;
(Continued)

(56) References Cited

U.S. PATENT DOCUMENTS

| | | | |
|---|---|---|---|
| 4,118,604 | A | 10/1978 | Yanick |
| 7,068,802 | B2 | 6/2006 | Schulz et al. |

(Continued)

FOREIGN PATENT DOCUMENTS

| | | | |
|---|---|---|---|
| EP | 1208723 | B1 | 10/2003 |

OTHER PUBLICATIONS

"U.S. Appl. No. 15/692,791, Non Final Office Action mailed Oct. 30, 2018", 17 pgs.

(Continued)

*Primary Examiner* — Carolyn R Edwards
*Assistant Examiner* — Julie X Dang
(74) *Attorney, Agent, or Firm* — Schwegman Lundberg & Woessner, P.A.

(57) ABSTRACT

The present subject matter provides a hearing device with selective adjustment of processor settings based on various characteristics of an input sound, in response to adjustment of output sound volume by a user. This addresses problems of undesirable sound effects resulting from applying same changes to processor settings to input sounds of all levels, frequencies, and classes.

20 Claims, 8 Drawing Sheets

Related U.S. Application Data continuation of application No. 16/537,973, filed on Aug. 12, 2019, now Pat. No. 10,945,086, which is a continuation of application No. 15/692,791, filed on Aug. 31, 2017, now Pat. No. 10,382,872.

(58) Field of Classification Search
CPC .. H04R 1/1008; H04R 1/1041; H04R 1/1083; H04R 2201/107
See application file for complete search history.

(56) References Cited

U.S. PATENT DOCUMENTS

| | | | | |
|---|---|---|---|---|
| 7,450,730 | B2 | 11/2008 | Berg et al. | |
| 8,165,329 | B2 | 4/2012 | Bisgaard | |
| 8,755,533 | B2 | 6/2014 | Banerjee et al. | |
| 8,848,954 | B2 | 9/2014 | Balke et al. | |
| 9,084,066 | B2 | 7/2015 | De Vries et al. | |
| 10,382,872 | B2 | 8/2019 | Gandhi et al. | |
| 10,945,086 | B2 * | 3/2021 | Gandhi | H04R 25/70 |
| 11,641,556 | B2 | 5/2023 | Gandhi et al. | |
| 2002/0076072 | A1 * | 6/2002 | Cornelisse | H03G 9/025 381/104 |
| 2006/0018496 | A1 | 1/2006 | Niederdrank et al. | |
| 2006/0204025 | A1 * | 9/2006 | Paludan-Muller | G10L 25/00 381/317 |
| 2006/0222194 | A1 * | 10/2006 | Bramslow | H04R 25/70 381/314 |
| 2011/0137649 | A1 * | 6/2011 | Rasmussen | H04R 25/43 704/E15.001 |
| 2014/0086427 | A1 * | 3/2014 | Yamkovoy | H03G 3/3026 381/74 |
| 2014/0146986 | A1 | 5/2014 | Ypma et al. | |
| 2015/0036851 | A1 | 2/2015 | Howes | |
| 2015/0043762 | A1 * | 2/2015 | Kim | H04R 25/405 381/315 |
| 2016/0353215 | A1 * | 12/2016 | Kindred | H04R 25/505 |
| 2017/0347179 | A1 | 11/2017 | Masaki et al. | |
| 2019/0028803 | A1 | 1/2019 | Benattar | |
| 2019/0069107 | A1 | 2/2019 | Gandhi et al. | |
| 2020/0045484 | A1 | 2/2020 | Gandhi et al. | |
| 2021/0185466 | A1 | 6/2021 | Gandhi et al. | |

OTHER PUBLICATIONS

"U.S. Appl. No. 15/692,791, Notice of Allowance mailed Apr. 3, 2019", 13 pgs.
"U.S. Appl. No. 15/692,791, Response filed Jan. 30, 2019 to Non Final Office Action mailed Oct. 30, 2018", 12 pgs.
"U.S. Appl. No. 16/537,973, Corrected Notice of Allowability mailed Dec. 18, 2020", 2 pgs.
"U.S. Appl. No. 16/537,973, Non Final Office Action mailed Mar. 25, 2020", 23 pgs.
"U.S. Appl. No. 16/537,973, Notice of Allowance mailed Nov. 3, 2020", 8 pgs.
"U.S. Appl. No. 16/537,973, Preliminary Amendment filed Oct. 28, 2019", 7 pgs.
"U.S. Appl. No. 16/537,973, Response filed Jul. 27, 2020 to Non Final Office Action mailed Mar. 25, 2020", 12 pgs.
"U.S. Appl. No. 17/249,244, Non Final Office Action mailed Aug. 4, 2022", 20 pgs.
"U.S. Appl. No. 17/249,244, Notice of Allowance mailed Dec. 21, 2022", 9 pgs.
"U.S. Appl. No. 17/249,244, Response filed Nov. 3, 2022 to Non Final Office Action mailed Aug. 4, 2022", 14 pgs.
"MiniTek and Tek wireless enhancement", Siemens, (2015), 53 pgs.
Banerjee, Shilpi, "The Compression Handbook", Third Edition. Starkey,, (2011), 60 pgs.
Dreschler, W., et al., "Client-Based Adjustments of Hearing Aid Gain: The Effect of Different Control Configurations", Ear & Hearing; 29, (2008), 214-227.
Keidser, G., et al., "Real-life efficacy and reliability of training a hearing aid", Ear & Hearing 34(5), (2013), 619-629.
Mueller, H.G., et al., "Using trainable hearing aids to exmine real-world preferred gain", Journal of the American Academy of Audiology 19, (2008), 16 pgs.
Zakis, J., et al., "The Design and Evaluation of a Hearing Aid with Trainable Amplification Parameters", Ear & Hearing; 28, (2007), 812-830.

* cited by examiner

HEARING DEVICE WITH USER DRIVEN SETTINGS ADJUSTMENT

CROSS-REFERENCE TO RELATED APPLICATION

This application is a continuation of U.S. patent application Ser. No. 17/249,244, filed Feb. 24, 2021, which is a continuation of U.S. patent application Ser. No. 16/537,973, filed Aug. 12, 2019, now issued as U.S. Pat. No. 10,945,086, which is a continuation of U.S. patent application Ser. No. 15/692,791, filed Aug. 31, 2017, now issued as U.S. Pat. No. 10,382,872, which is incorporated by reference herein in its entirety.

TECHNICAL FIELD

This document relates generally to hearing systems and more particularly to a hearing device that adjusts its various processor settings in response to volume adjustment made by a user.

BACKGROUND

Hearing devices provide sound for the listener. Some examples of hearing devices are headsets, hearing aids, speakers, cochlear implants, bone conduction devices, and personal listening devices. A hearing aid provides amplification to compensate for hearing loss of a wearer by transmitting amplified sound to an ear canal of the wearer. In various examples, a hearing aid is worn in and/or around the wearer's ear. The sounds may be detected from the wearer's environment using the microphone in a hearing aid. The hearing aid may allow the wearer to adjust the volume of the amplified sound for comfort of listening and/or speech intelligibility, among other things.

SUMMARY

The present subject matter provides a hearing device with selective adjustment of processor settings based on various characteristics of an input sound, in response to adjustment of output sound volume by a user. This addresses problems of undesirable sound effects resulting from applying same changes to processor settings to input sounds of all levels, frequencies, and classes.

In one example, a user-adjustable audio system can include a microphone, a volume controller, an audio processor, and a speaker (receiver). The microphone can receive an input sound and to produce a microphone signal representative of the received input sound. The volume controller can receive a volume control (VC) command. The audio processor can produce an output audio signal using the microphone signal according to a plurality of processor settings, and includes an environmental parameter detector and a processing adjuster. The environmental parameter detector can detect one or more environmental parameters from the microphone signal upon receiving the VC command. The one or more environmental parameters characterize the input sound received when the VC command is received, and include at least a level of the input sound. The processing adjuster can adjust one or more processor settings of the plurality of processor settings, based on at least the VC command and the one or more environmental parameters, to control signals substantially characteristic of the detected one or more environmental parameters. The speaker can produce an output sound using the output audio signal.

In one example, a method for operating a user-adjustable hearing device is provided. The method can include: receiving an input sound and producing a microphone signal representative of the input sound using a microphone of the hearing device; processing the microphone signal to produce an output audio signal using a processor of the hearing device according to a plurality of processor settings; generating an output sound based on the output audio signal using a speaker of the hearing device; receiving a volume control (VC) command from the user; detecting one or more environmental parameters upon receiving the VC command; and adjusting one or more processor settings of the plurality of processor settings to control signals substantially characteristic of the detected one or more environmental parameters using the VC command and the detected one or more environmental parameters. The one or more environmental parameters characterize the input sound received when the VC command is received, and include at least a level of the input sound.

This summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
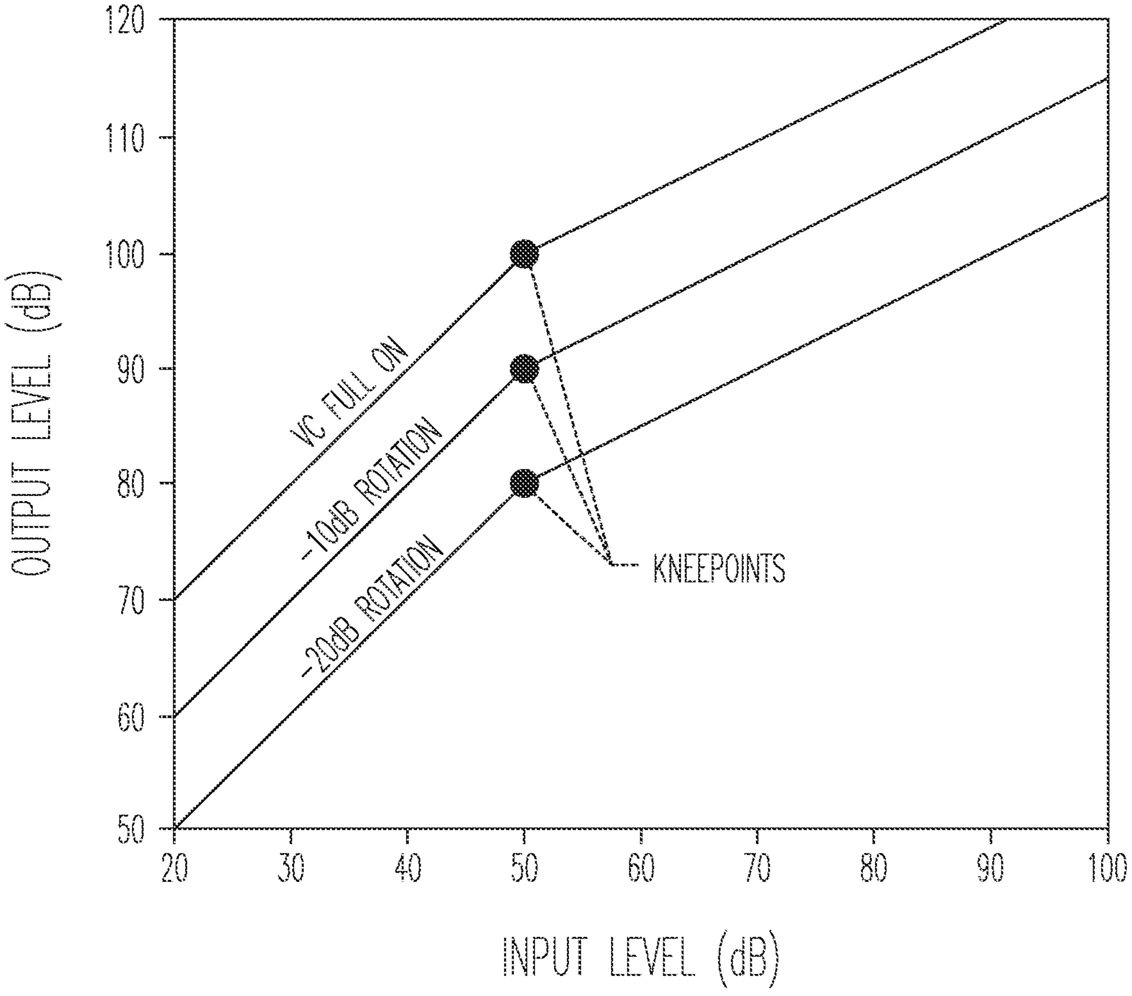
FIG. 1 is an illustration of an exemplary input/output (I/O) curve showing input compression.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses, among other things, a hearing device that can adjust various settings in response to volume adjustment made by a user. In various embodiments, the hearing device can include a hearing aid, with the user being the wearer of the hearing aid.

In various examples of hearing aids, volume controls (VCs) apply the same gain change across all frequencies and for all levels and types of sounds regardless of the input signal. Hearing aids that allow the wearer to manipulate additional parameters (e.g., compression and frequency shaping parameters) may require multiple user controls that are not intuitive, but challenging for the wearer to manipulate. Some examples of such user controls use a user interface implemented on a smart phone. The present subject matter provides a hearing device with a simple and intuitive user interface for optimizing gain, compression and frequency response to volume adjustments made by the user of the hearing device. It can be implemented within the hearing aid, without requiring additional hardware external to the hearing aid. However, it can also be implemented using an external user interface device including a VC, such as a remote control, a smart phone, or a smart watch, that allows the wearer to make volume adjustments. In either case, the present subject matter simplifies control of hearing aid settings by using VC to control various settings besides the gain. In various embodiments, when the user of the hearing device adjusts the volume, an environmental signal is analyzed to determine how the gain of the hearing device should be adjusted. For example, if the user increases the volume, and the environmental sound level is low, the gain will be increased for soft (low-level) sounds, and if the user decreases the volume, the gain will be decreased for soft sounds. Similarly, if the listener is in a loud environment when these changes are requested, the gain for loud (high-level) sounds will be adjusted when the user adjusts the volume. Various embodiment can also change the gains in a subset of the frequency channels of the hearing device when the VC is manipulated. Various embodiments can learn the user's preferences over time in various environments, so that after a period of time, the gain can be changed automatically according to learned user preferences.

In many examples of existing hearing aids, input compression is applied. FIG. 1 is an illustration of an exemplary input/output (I/O) curve showing input compression. With these devices, when the VC is adjusted, the volume of all sounds is increased or decreased by the same amount, regardless of the level, frequency content, and/or type of sound of the incoming signal. Further, when the maximum output of the hearing aid is not reached, the compression ratio (CR) above the knee point (TK) does not change. This means that when the wearer increases the VC in a quiet environment, the gain is turned up for both the soft speech that he/she is listening to now and for the loud sounds that he/she may encounter later in the day. Consequently, the wearer will likely have to adjust the gain down when the loud sounds are encountered. An audiologist may solve this problem by increasing or decreasing the gain for only the input signal (soft or loud) that is causing difficulty to the wearer. This would have the effect of modifying the CR.

Traditional VCs (using input compression) alter the gain of the hearing aid, but the CR stays constant until the maximum output of the hearing aid is reached, at which point a higher CR (e.g. 10:1) may be used. It has been difficult to create a user interface that is intuitive to use while allowing the hearing aid wearer to adjust various settings including the overall volume, the frequency response, and the compression of the hearing aid. Investigations into learning and trainable hearing aids have generally either limited by the number of parameters that listeners can adjust, or used complicated user interfaces involving multiple rotary controls and voting buttons to allow the hearing aid wearers to adjust multiple parameters at once. Smart phone based user interfaces allow the hearing aid wearers to adjust, for example, the bass, treble, and gain using a mobile application. However, the adjustments are not intuitive and requires considerable amount of technical skill to use, and consequently may not be suitable for use by many hearing aid wearers.

These traditional VCs function differently from the types of adjustments that an audiologist would make when a patient (hearing aid wearer) has complaints about his/her hearing aid. For example, if the patient complains that loud sounds are too loud, the audiologist would decrease the gain for loud sounds only, rather than decreasing the gain for all sounds. Similarly, if the patient complains that soft sounds are too quiet, the audiologist would increase the gain for soft sounds only, rather than increasing the gain for all sounds. Further, if the patient's complaint is associated with a specific environment or sound class (e.g., speech or wind noise), the audiologist would increase or decrease the gain in the frequency channels specifically related to the patient's complaint, rather than adjusting the gain at all frequencies. For example, if speech is too soft, the audiologist would increase the gain for soft sounds in the frequency region known to be important for speech understanding (e.g., 1-4 kHz). Similarly, if wind noise is too loud, the audiologist would decrease the gain for loud sounds in the low frequencies and/or increase the gain reduction for that sound class.

The present subject matter mimics changes that an audiologist would make to hearing aid settings. This is possible because the hearing aid can analyze the incoming signal to determine whether it is low, moderate or high in level, and can learn whether the wearer wants the volume louder or softer based on VC adjustment he/she made. Therefore, the hearing aid can adjust the gain for sounds at one input level without affecting the gains at another input level. In some embodiments, the hearing aid can apply different gain adjustments based on the frequency content of the incoming signal and the sound classification (e.g., whether the incoming signal represents speech, wind, music, machinery, etc.).

Figure 2:
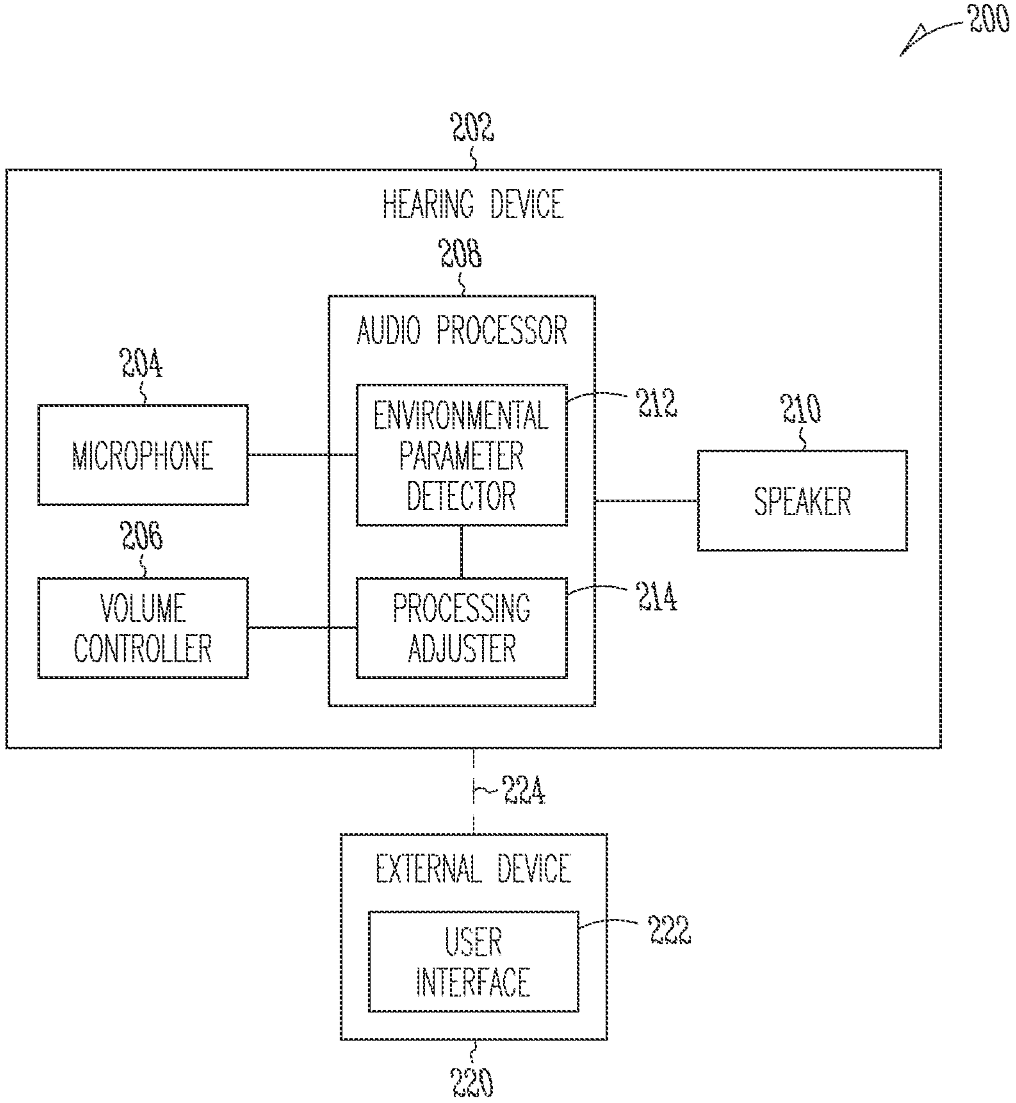
FIG. 2 is a block diagram illustrating an exemplary embodiment of an audio system including a hearing device and an external device.

FIG. 2 is a block diagram illustrating an exemplary embodiment of an audio system 200 including a hearing device 202 and an external device 220. System 200 include functions adjustable by its user. The user can be a listener to who hearing device 202 delivers an output sound. In various embodiments, hearing device 202 can include a hearing aid, and the user can be the wearer of the hearing aid. The hearing aid can be used to compensate for hearing loss of the wearer.

Hearing device 202 can include a microphone 204, a volume controller 206, an audio processor 208, and a speaker 210. Microphone 204 can receive an input sound and produce a microphone signal representative of the received input sound. Volume controller 206 is configured to receive a volume control (VC) command. The VC command can include a volume-up command for increasing a volume of the output sound (i.e., for making the output sound louder) and a volume-down command for decreasing the volume of the output sound (i.e., for making the output sound softer). Audio processor 208 can produce an output audio signal using the microphone signal according to a plurality of processor settings. Speaker (receiver) 210 can produce an output sound using the output audio signal. The user of hearing device 202 can be the listener of the output sound.

Audio processor 208 can include an environmental parameter detector 212 and a processing adjuster 214. Environmental parameter detector 212 can detect one or more environmental parameters from the microphone signal upon receiving the VC command. The one or more environmental parameters characterize the input sound received when the VC command is received. The one or more environmental parameters includes at least a level of the input sound. Examples of other one or more environmental parameters can include, but are not limited to, an estimation of the signal-to-noise ratio (SNR) of the input sound, interaural time differences (ITDs, when binaural hearing devices are used), interaural level differences (ILDs, when binaural hearing devices are used), a classification of the input sound, and a geographic location of hearing device 202 (which is also the geographic location of the user). Processing adjuster 214 can adjust one or more processor settings (i.e., one or more settings of audio processor 208), based on at least the VC command (e.g., whether it is a volume-up command or a volume-down command) and the one or more environmental parameters (e.g., whether the input sound is soft or loud), to control signals substantially characteristic of the detected one or more environmental parameters. In other words, the one or more processor settings are adjusted for processing future input sounds that are substantially characteristic of the detected one or more environmental parameters. For example, if the detected one or more environmental parameters characterize an input sound as a soft input sound, the one or more processor settings are adjusted for processing future input sounds that are each also a soft (low in level) input sound. In this document, “substantially characteristic” means characteristics of two signals match except for processing inaccuracies such as those caused by electronic component tolerances, how detection thresholds are set, and whether/how different increments are used in detection and controlling of signals. In various embodiments, the adjusted one or more processor settings can include, but are not limited to, one or more of a gain (i.e., ratio of the level of the output sound to the level of the input sound, which can be detected as the ratio of the amplitude of the audio output signal to the amplitude of the microphone signal), a compression ratio (CR) applied to the microphone signal, and a frequency response.

In some embodiments, audio processor 208 can include a plurality of frequency channels for processing the microphone signal at a plurality of frequency ranges. Environmental parameter detector 212 can detect the one or more environmental parameters for specific frequency ranges (e.g., selected from the frequency ranges of the plurality of frequency channels). For example, environmental parameter detector 212 can detect the one or more environmental parameters from the microphone signal filtered for the specific frequency ranges. Processing adjuster 214 can adjust the one or more processor settings for each channel of the plurality of frequency channels. In various embodiments, the adjustment can be determined and applied to all the channels of the plurality of frequency channels uniformly, to each of the plurality of frequency channels independently, or to a subset of the plurality of frequency channels. The subset can be selected from the plurality of frequency channels based on one or more criteria such as a number, a percentage of the plurality of frequency channels, a function of the VC command and/or the detected one or more environmental parameters, or any of their combinations.

External device 220 can be communicatively coupled to hearing device 202 via a wireless communication link 224. Examples of external device 220 can include, but are not limited to, a programmer, a remote control device, a mobile phone, and a smart phone or smart watch. External device 220 includes a user interface 222 to allow the user to adjust one or more user-adjustable functions of system 200. In various embodiments, user interface 222 can receive the VC command of the user and transmit it to hearing device 202 to be received by volume controller 206. In various other embodiments, hearing devices 202 is configured to receive the VC command from the user directly, without going through another device.

Figure 3:
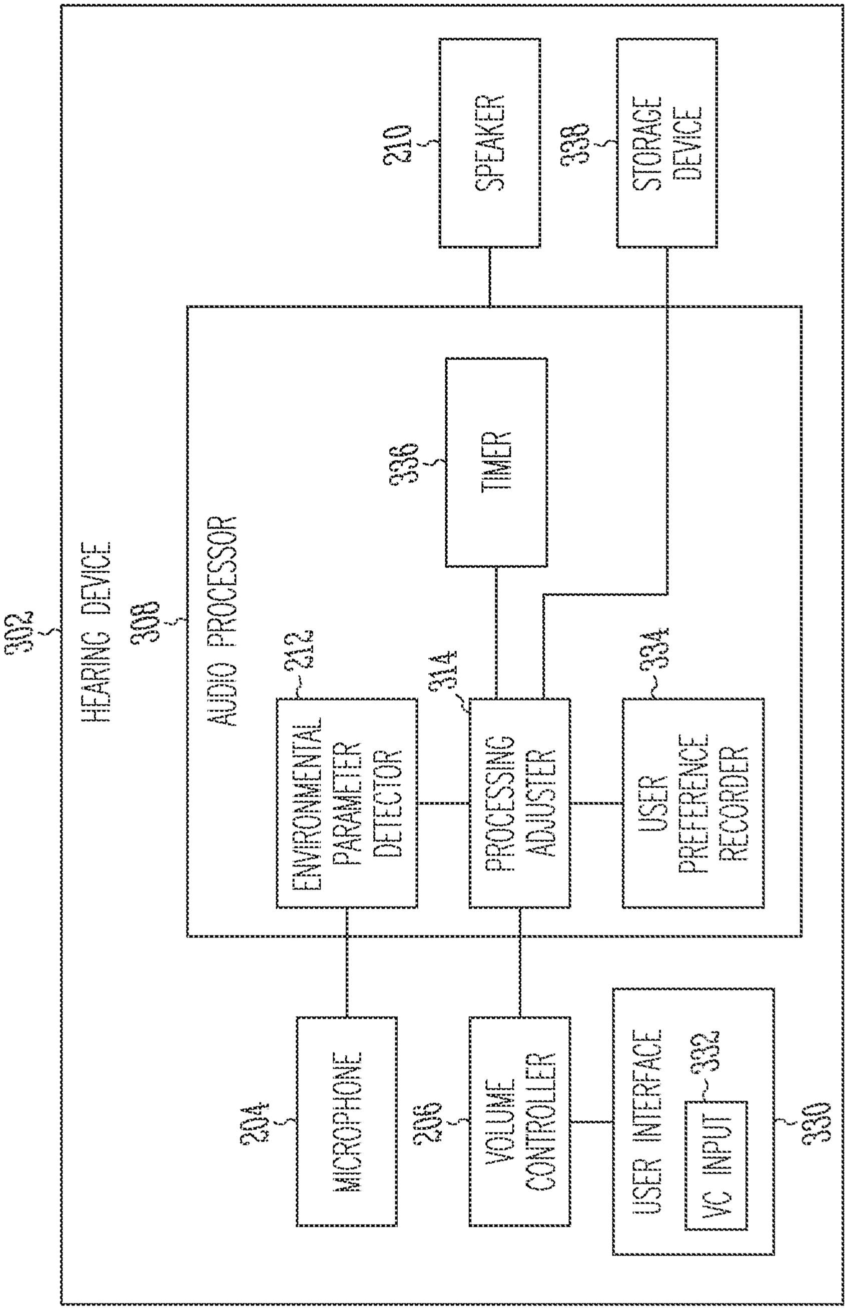
FIG. 3 is a block diagram illustrating an exemplary embodiment of the hearing device.

FIG. 3 is a block diagram illustrating an exemplary embodiment of a hearing device 302. In various embodiments, hearing device 302 can perform all the functions of hearing device 202 as well as additional functions including at least those discussed in this document. As illustrated in FIG. 3, hearing device 302 can include microphone 204, volume controller 206, a user interface 330, an audio processor 308, a storage device 338, and speaker 210.

In the illustrated embodiment, user interface 330 includes a VC input 332 to receive the VC command from the user. VC input 332 can include a mechanical switch (e.g., slider or dial), a sensor that can sense finger touch or finger movement in the proximity (e.g., a pressure sensor, a piezoelectric sensor, or a magnetostrictive electroactive sensor), and/or a touchscreen. In other embodiments, hearing device 302 can receive the VC command from an external device, such as external device 220, that allows the user to enter the VC command.

Audio processor 308 can be configured to perform the function of audio processor 208 as well as additional functions including, but not limited to, those discussed with reference to FIG. 3. As illustrated in FIG. 3, audio processor can include environmental parameter detector 212, a processing adjuster 314, a user preference recorder 334, and a timer 336. In various embodiments, audio processor 308 can include a plurality of frequency channels for processing the microphone signal at a plurality of frequency ranges to produce the output audio signal.

User preference recorder 334 can record one or more user preferences for the output sound. In some embodiments, user preference recorder 334 can receive the one or more user preferences from the user via user interface 330 and/or an external device such as external device 220. In some embodiments, user preference recorder 334 can execute a machine learning algorithm to learn the one or more user preferences automatically over time when the hearing device is used by the user, and record the learned one or more user preferences. For example, user preference recorder 334 can collect information associated with the VC commands entered by the user under various acoustic environmental contexts (e.g., for various values of the one or more environmental parameters), and perform statistical analysis to learn the one or more user preferences in the various acoustic environmental contexts. In some embodiments, user preference recorder 334 can receive one or more biological signals from one or more biological sensors and analyze the one or more biological signals for indications of one or more user preferences. For example, a listener's listening intent may be inferred from one or more electroencephalographic (EEG) signals. In various embodiments, it may be assumed that within a given acoustic environment, the user's listening goals do not change, and his/her preferences do not change dramatically over time. This assumption may be correct in some acoustic environments and incorrect in others. For example, if the user is in a sports bar, he/she may want his/her hearing device set differently depending on whether he/she is listening to a live band or to a person sitting across the table from him/her. Thus, the one or more user preferences for a given acoustic environment may be multi-modal. For example, in a sports bar, the user may like to hear something different if he/she is listening to speech than if he/she is listening to a live band. In such cases, user preference recorder 334 can perform additional analysis using stored data to determine the one or more user preferences for that acoustic environment.

Processing adjuster 314 can adjust one or more processor settings (i.e., one or more settings of a plurality of settings of audio processor 308) based on the VC command, the one or more environmental parameters detected by environmental parameter detector 212, and/or the one or more user preferences recorded by user preference recorder 334. In various embodiments, processing adjuster 314 can be configured to adjust the one or more processor settings based on (1) the VC command, (2) the VC command and the detected one or more environmental parameters, (3) the VC command and the recorded one or more user preferences, and (4) the VC command, the detected one or more environmental parameters, and the recorded one or more user preferences. In various embodiments, the one or more processor settings can include, but are not limited to, the gain, the CR, and the frequency response. In various embodiment, the detected one or more environmental parameters include at least the detected level of the input sound, and processing adjuster 314 can adjust the one or more processor settings for input sounds having the level within a range of levels determined based on the detected level of the input sound. In various embodiments, processing adjuster 314 can optimize the one or more processor settings for identified needs of the user.

In various embodiments, processing adjuster 314 can adjust the one or more processor settings by selecting an input/output (I/O) curve from multiple I.O curves based on the VC command, the detected one or more environmental parameters, and/or the recorded one or more user preferences. Each I/O curve is representative of the gain for various levels of the input sound. The multiple I/O curves can be determined for various values of the one or more environmental parameters and/or various geographic locations based on assumed or explicitly indicated intent of the user.

In various embodiments, processing adjuster 314 can adjust the one or more processor settings for each channel of the plurality of frequency channels of audio processor 308. The adjustment can be determined and applied to all the channels of the plurality of frequency channels uniformly, to each of the plurality of frequency channels independently, or to a subset of the plurality of frequency channels. The subset can be selected from the plurality of frequency channels based on one or more criteria, such as based one or more criteria such as a number, a percentage of the plurality of frequency channels, a function of the VC command, the detected one or more environmental parameters, and/or the recorded one or more user preferences, or any of their combinations.

Timer 336 can time a time period starting from an adjustment made to the one or more processor settings. In some embodiments, processing adjuster 314 can adjust the one or more processor settings in response to the VC command based on whether the time period has expired (in addition to the VC command, the detected one or more environmental parameters, and/or the recorded one or more user preferences). For example, repeated VC commands within a short period of time may indicate that the user wants to undo previous VC changes or revert to a default setting. In some embodiments, processing adjuster 314 can revert the one or more processor settings to default settings when hearing device 302 is turned on or rebooted.

Storage device 338 can store various information used by hearing device 302. Such information can include, but are not limited to, the default settings for the one or more processor settings, the one or more user preferences, the I/O curves, and any information that can be saved for use by audio processor 308 including, but not being limited to, the types of such information discussed in this document.

"Settings Adjustment Examples" 1-5 are discussed below to illustrate, but not to restrict, how hearing device 302 can be configured for adjusting the one or more processor settings based on at least the VC command. These examples illustrates, rather than restricts, how VC commands are used to control various settings of hearing device 302. In this document, a "soft" sound refers to a low-level sound (e.g., having a level below a low threshold), and a "loud" sound refers to a high-level sound (e.g., having a level above a high threshold). The low threshold can be the same as the high threshold (thereby dividing sounds into soft and loud sounds), or can be different thresholds (thereby allowing for one or more moderate levels). A "soft environment" or "soft sound environment" refers to the input sound being a soft sound, and a "loud environment" or "loud sound environment" refers to the input sound being a loud sound. Various embodiments can use two or more levels when dividing levels of a sound, as determined by those skilled in the art. In various embodiment, the level of the input sound can be measured by the amplitude of the microphone signal. An "input level" refers to the level of the input sound, and an "output level" refers to the level of the output sound (also referred to as "volume").

Settings Adjustment Example 1

Figure 4:
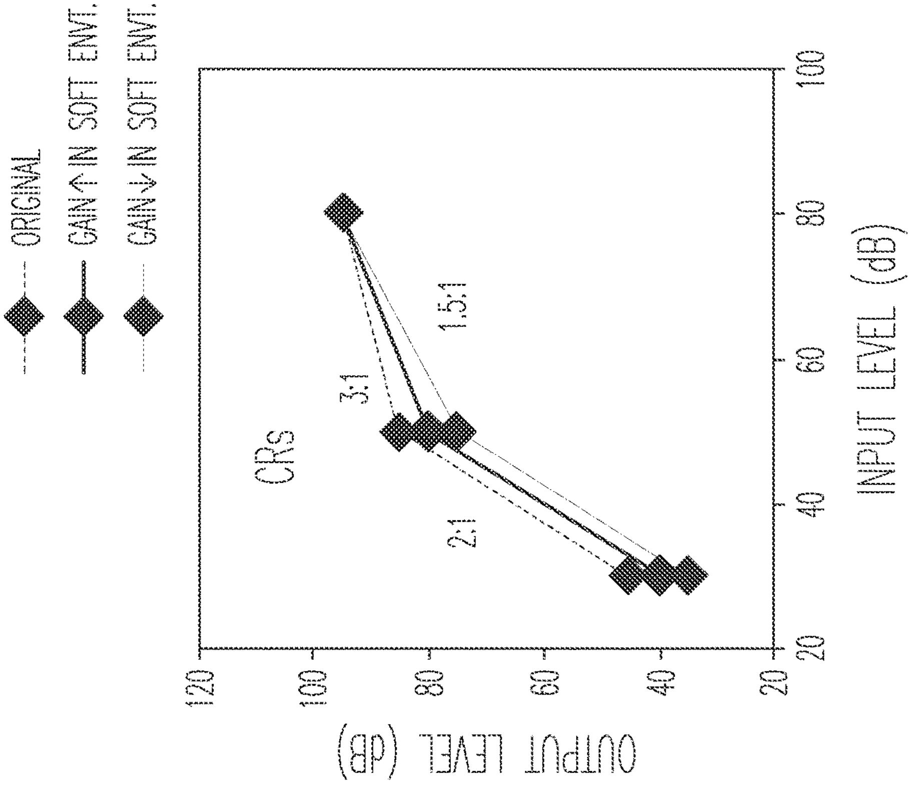
FIG. 4 is an illustration of exemplary I/O curves for a soft sound environment in an exemplary embodiment of the hearing device.
Figure 5:
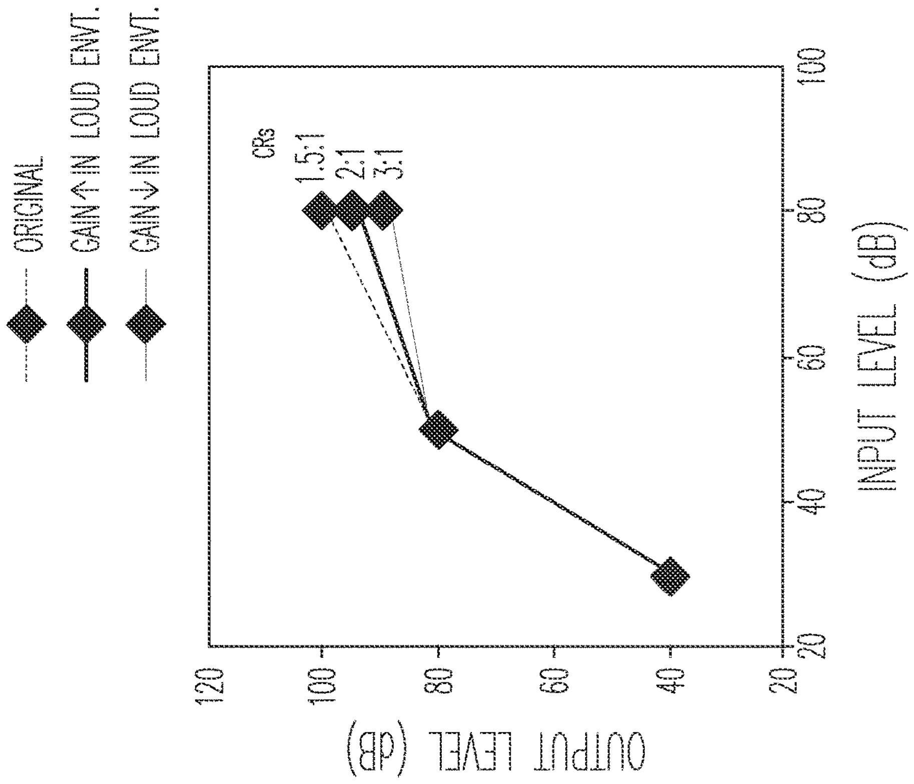
FIG. 5 is an illustration of exemplary I/O curves for a loud sound environment in an exemplary embodiment of the hearing device.

In this example, processing adjuster 314 adjusts the one or more processor settings (e.g., the gain, the CR, and/or the frequency response) based on the VC command and the input level. The gain changes may only occur at the detected input level. If the user indicates that he/she wants the volume higher (e.g., by entering the volume-up command), and the input sound is soft, the gain for only the soft sounds will be increased (without change the gain for the loud sounds). If the user wants the volume lower (e.g., by entering the volume-down command), in the same environment (i.e., the input sound is soft), the gain for only the soft sounds will be decreased. Similarly, if the user is in a loud environment, and makes these same adjustments, the gains for only the loud sounds will be increased or decreased accordingly (without change the gain for the soft sounds). By adjusting the gain for only the soft or loud sounds, the CR are also adjusted, such as illustrated in FIGS. 4 and 5. FIG. 4 is an illustration of exemplary I/O curves for a soft environment. FIG. 5 is an illustration of exemplary I/O curves for a loud environment. In this example, processing adjuster 314 ensures that the CRs are between 1:1 and 3:1.

Figure 6:
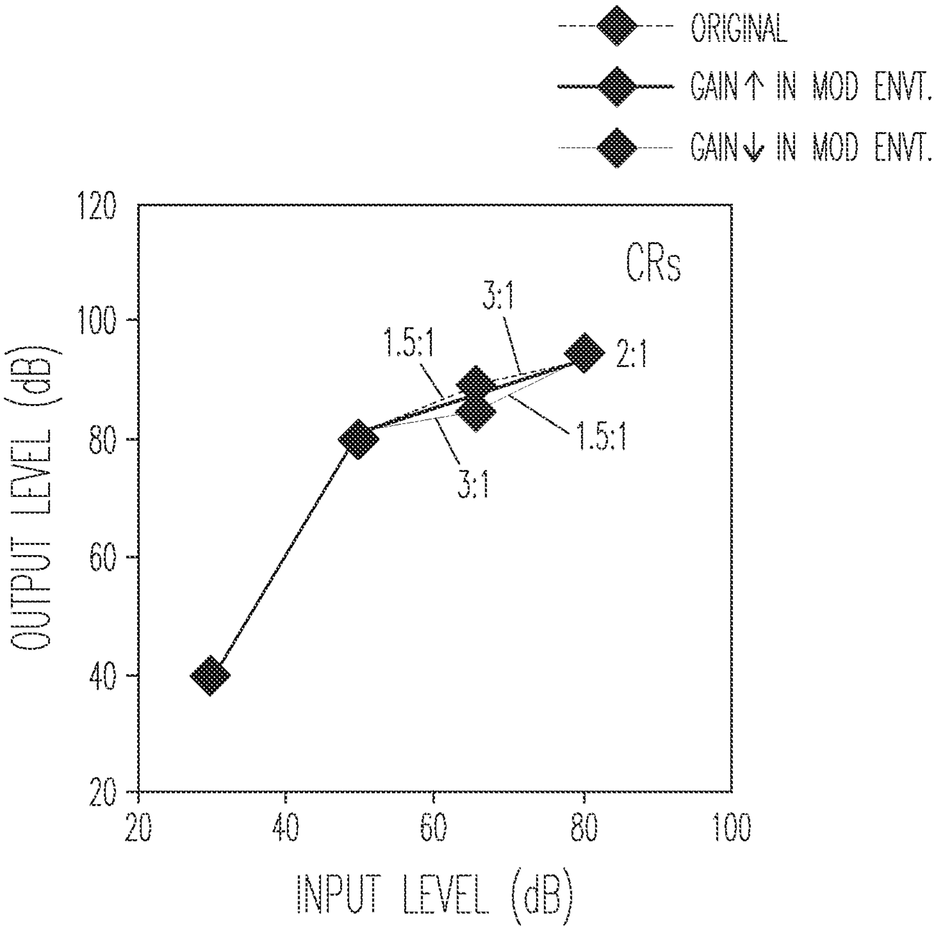
FIG. 6 is an illustration of exemplary I/O curves for a moderate sound environment in an exemplary embodiment of the hearing device.

If the input sound has a moderate level, the adjustment of the gain, the CR, and the frequency response of audio processor 308 by processing adjuster 314 depends on whether an I/O curve has a knee point at that moderate level. If there is no knee point at that moderate level, the gain will be adjusted at the knee point that is closest in the level. If there is a knee point at that moderate level, a volume-up command will result in decrease of the CR below this knee point and increase of the CR above this knee point, and a volume-down command will result in increase of the CR below this knee point and decrease of the CR above this knee point. Having additional knee points allows for more regions of compression, resulting in a "stepped" compression curve, such as illustrated in FIG. 6. FIG. 6 is an illustration of exemplary I/O curves for in a moderate sound environment in an exemplary embodiment of the hearing device.

Settings Adjustment Example 2

Figure 7:
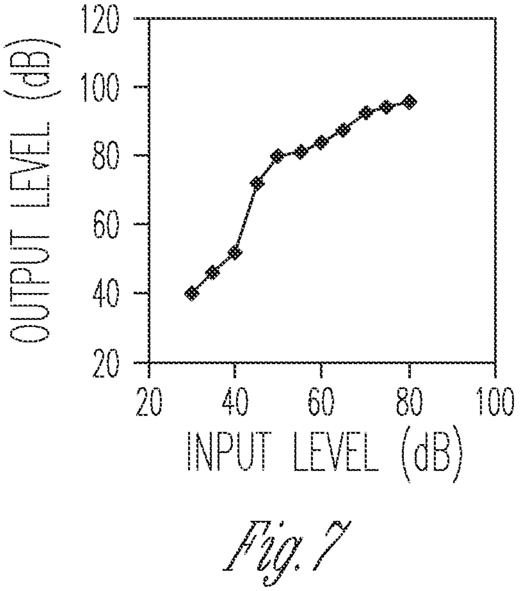
FIG. 7 is an illustration of an exemplary I/O curve with multiple compression regions in an exemplary embodiment of the hearing device.
Figure 8:
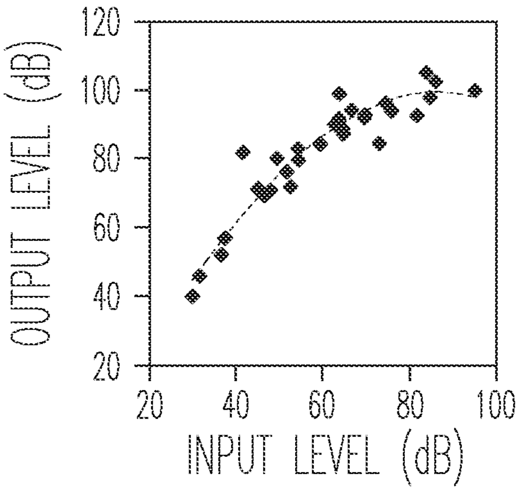
FIG. 8 is an illustration of an exemplary I/O curve with curvilinear compression in an exemplary embodiment of the hearing device.

In this example, processing adjuster 314 adjusts the one or more processor settings (e.g., the gain, the CR, and/or the frequency response) based on the VC command, the input level, and the one or more user preferences. If user preference recorder 334 logs the user's gain/CR preferences over time, when sufficient data points are collected, an I/O curve can be fit to the collected data to create an I/O curve with multiple compression regions or an I/O curve with curvilinear compression, such as illustrated in FIGS. 7 and 8, respectively. The I/O curve can be updated over time as the user enters additional VC commands.

FIG. 7 is an illustration of an exemplary I/O curve with multiple compression regions. The illustrated I/O curve is a "stepped" I/O curve, in which there are many knee points and independent regions of compression. Each data point can be based off predetermined gain values (e.g. from a fitting formula), and adjusted up and down based on the input level and the direction and amount of change that the user makes to the volume using the VC command. Processing adjuster 314 can also remember the gain changes over time and average these changes to create a compression curve that will become the default for future gain calculations. Averaging may be performed as the mean, median, mode, or a weighted average of the data points, which may take into consideration which gains are chosen most frequently or which have been chosen most recently.

FIG. 8 is an illustration of an exemplary I/O curve with curvilinear compression. The illustrated 1/O curve is a curvilinear I/O curve, in which preferred gain and output levels are logged over time for different input levels, and a curve is fit to the data to create the compression characteristics. This curve, once generated (e.g., for a frequency channel), will become the default compression curve (e.g., for that frequency channel); however, it will be continually updated based on additional VC commands entered by the user. Processing adjuster 314 can also generate these curves on a channel-specific basis for each environment in which the user enters the VC commands (e.g., speech, wind, music, or machinery sound).

Settings Adjustment Example 3

In this example, processing adjuster 314 can make the adjustments discussed in the Settings Adjustment Examples 1 and 2, including any combination of such adjustments, for each channel of the plurality of frequency channels of audio processor 308 independently based on the input level to that channel. Processing adjuster 314 can also alter the gain and CR in a subset (e.g., a certain number or percentage) of the plurality of frequency channels according to certain specified logic. For example, if the user is in a very loud environment and turns the volume down, it can be sufficient to decrease the gain (and adjust the CR) in the "x" channels that are highest in the input level, or that contribute most to the overall perception of loudness or annoyance (where "x" can be between 1 and the total number of frequently channels minus 1). This can be especially useful if the undesirable signal has energy that is concentrated in a specific frequency range, as may occur with wind noise or machinery sound. In this case, sound classification by environmental parameter detector 212 may help identify the frequency channel(s) for which the gain should be modified in response to the VC command. Using this type of criterion can maximize the impact of the VC command by affecting the gain in the channels that are most likely contributing to the perception to which the user is objecting, while minimizing the impact to frequency regions that have minimal impact on the user's present listening experience. This can be especially valuable in situations in which environmental parameter detector 212 detects two or more sound classes that are different in level and frequency response. For example, wind noise is very high in level and low in frequency (less than 500 Hz) and speech is moderate in level and mid-to-high in frequency (1-4 kHz). If the two stimuli occurred together, and the user the volume down, processing adjustor 314 can determine that most of the energy is in the low frequencies, assuming this is the sound to which the user is objecting, and decrease the gain for the wind noise while leaving the gain for the speech frequencies unchanged.

Settings Adjustment Example 4

In this example, processing adjuster 314 can make the adjustments discussed in the Settings Adjustment Examples 1-3, including any combination of such adjustments, for each sound class as detected by environmental parameter detector 212. If the user enters the VC command, processing adjuster 314 can prioritize certain frequency channels of audio processor 308 depending on the sound classification. For example, if speech is detected, processing adjuster 314 can increase the gain and adjust the CR for frequencies that contribute most to speech understanding (e.g., 1-4 kHz) or for those in which the best SNR is detected. If other signals (e.g., music) are detected, processing adjuster 314 can prioritize the adjustment of other frequencies (e.g., a broadband response, or the very high- and very low-frequency channels) in order to optimize the user's listening experience.

Environmental parameter detector 212 can analyze the microphone signal to determine various characteristics of the input sound (e.g., frequency content, estimated SNR, environmental class, and loudness across frequency. Processing adjuster 314 can combine the result of this analysis (e.g., as environmental classification) with the VC command (e.g., volume-up or volume down) to make assumptions on the user's goal(s) in the environment, and accordingly, to determine how the one or more processor settings should be adjusted. With such information, processing adjuster 314 can make gain and compression adjustments to be applied to all or a subset of the plurality of frequency channels of audio processor 308. Some specific examples are provided below for the purpose of illustration but not restriction:

Example 1

Input level: high.
VC command: volume-down.
Environment classification: wind.
Assumption: the user is trying to reduce the loudness (or annoyance) of the incoming sound.
Adjustment: the gain is reduced for loud sounds in low frequencies.

Example 2

Input level: high.
VC command: volume-down.
Environment classification: machine noise.
Assumption: the user is trying to reduce the loudness (or annoyance) of the incoming sound.
Adjustment: the gain is reduced for the frequency channels that are contributing the most to the overall perception of loudness (or annoyance).

Example 3

Input level: low.
VC command: volume-up.
Environment classification: speech.
Assumption: the user wants to hear the speech better.
Adjustment: the gain is increased for soft sounds in the frequency channels that are most important for speech understanding (e.g., 1-4 kHz).

Example 4

Input level: low to moderate.
VC command: volume-up.
Environment classification: music.
Assumption: the user wants better audibility and/or sound quality.
Adjustment: the gain is increased for soft and moderate level input sounds across all frequency channels (alternatively, the gain is boosted in the very high-frequency and very low-frequency channels).

If a combination of environmental classifications is made for the input sound (e.g., speech and wind) when the VC command is entered, processing adjuster 314 can make assumptions based on what is most likely in that scenario. For example, if the volume-down command is received, and most of the acoustic energy is distributed in the low frequencies, processing adjuster 314 may assume that the user wants the gain to be decreased for this input sound except for its speech components. Likewise, if the volume-up command is received, processing adjuster 314 may assume that the user wants to hear speech better in wind, rather than wanting the wind noise to be amplified more. However, in the former situation, there may also come a point at which the output sound in the frequency ranges that contain wind are well below those of the speech. At this point, additional volume-down commands may indicate that the user wants the gain decreased for speech too. If the environment cannot be classified, or the classification is rapidly changing, a general (i.e., non-environment-specific) adjustment may be made. By modifying the one or more processor settings in this manner, the gain and CR adjustments closely mimic the changes that an audiologist would make based on situation-specific complaints.

Settings Adjustment Example 5

In this example, the user is in a relatively complicated acoustic environment such as a sports bar. Various acoustic targets co-exist for the user, who may want to focus on different targets at different time while in that acoustic environment. For example, the user may want to listen to a live band or to a person sitting across the table from him/her. Processing adjuster 314 can adjust the hearing device to accommodate the user's preferences.

Figure 9:
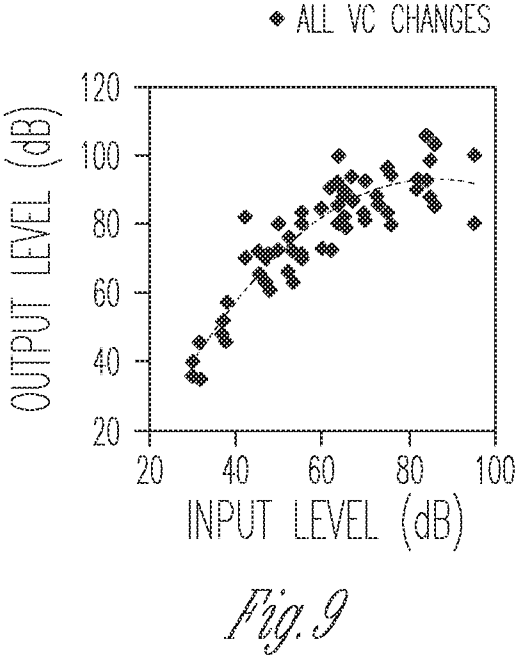
FIG. 9 is an illustration of an exemplary 1/O curve in a sports bar in an exemplary embodiment of the hearing device.
Figure 10:
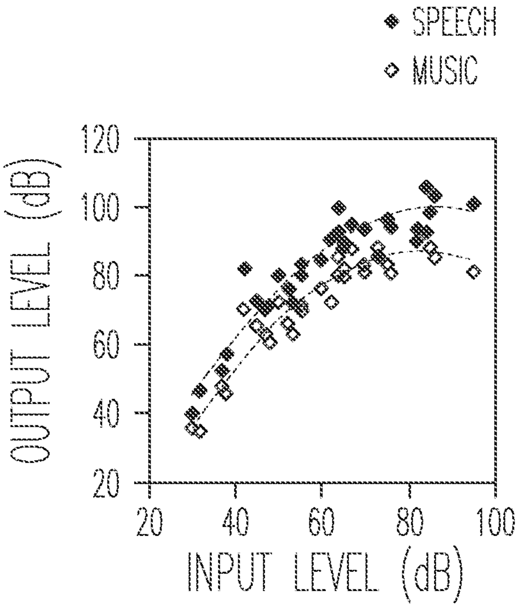
FIG. 10 is an illustration of exemplary I/O curves for different signals of interest in a sports bar, in an exemplary embodiment of the hearing device.

FIG. 9 is an illustration of an exemplary I/O curve in a sports bar. The I/O curve is applied to the microphone signal regardless of the acoustic environment. FIG. 10 is an illustration of exemplary I/O curves for different signals of interest in a sport bar. The I/O curves are separated according to the user's intent (i.e., the signal(s) of interest in the acoustic environment). If different I/O curves are desired for the same acoustic environment, the user's preferences are multimodal, which allows the user to have finer control over the hearing device settings. To accommodate this, processing adjuster 314 can collect statistics of the VC commands entered in different environmental contexts to learn the user's preferences in these different contexts. For example, a mode estimation method is discussed in B. W. Silverman, "Using Kernel Density Estimates to Investigate Multimodality", *J. R. Statist. Soc.* B, 43, No. 1, pp. 97-99 (1981), which is incorporated herein by reference in its entirety. This mode estimation method allows the estimation of the number and values of the modes of the output levels at each input level. The product of the number of modes for each input level then forms the combinatorial upper bound for possible I/O curves. A set of all such curves can be defined as $c \in C$, where c is a curve and C is the collection of all possible curves. Heuristics can be used to eliminate some of the possible I/O curve shapes in this set based upon common audiological practice to ensure no inappropriate I/O (e.g., an I/O curve that has CRs outside of a pre-defined acceptable range) is selected. At any given time, the user's preference would be just one of the remaining possible curves in C.

Over time, a histogram of the amount of time spent at each curve c can be created. This can be multimodal, where the modes correspond to the sought after environments and listening strategies. Again using a method such as the mode estimation method discussed in Silverman (1981) allows for learning the subset of curves in C, which the user frequently prefers. The parameters defining these preferred curves can be refined with time as more data is collected. These curves can be stored in the hearing device or an external device for later retrieval. If multiple I/O curves are available for a given acoustic environment, processing adjuster 314 can employ one or more of a variety of options for determining which I/O curve should be used, such as discussed as follows:

A sequence of volume changes by the user in a given acoustic context can be used to infer the maximally likely desired I/O curve. If the likelihood of a given I/O curve exceeds a certain threshold, this I/O curve can be switched to automatically.

The hearing device can assume that the I/O curve that is used most frequently in an environment is the desired I/O curve and uses it as the default. If the VC command directs volume change in the direction of anther I/O curve, the hearing device could switch to using that I/O curve. This is different from just modifying a portion of the I/O curve, or adding another data point to the calculation of an existing I/O curve. It is switching to a completely different I/O curve. For example, if over time the hearing device learns that volume changes resulting from the VC command entered in a sports bar are bimodal or multimodal and can best be represented by two independent I/O curves, and the user typically turns the volume up, the upper I/O curve shown in FIG. 10 (i.e., for speech) could be used as the default. However, if the user then tuned down the volume, the hearing device will switch to using the lower I/O curve in FIG. 10.

User's intent (i.e., which I/O curve is desired) can be inferred through use of biological sensors (e.g., EEG sensors) to determine the signal to which an individual is attending. For example, the time domain envelope of attended speech may be present in evoked electrical potential data, and this may correlate to the envelope found in some subbands. If this correlation is found, those bands can be prime candidates for being adjusted in response to VC commands. Signals sensed by a biological sensor may also be used to infer the user's attended direction, and then used to separate signal from noise accordingly.

Once enough data are collected that bimodal or multimodal intent is suspected in a given acoustic environment, the hearing device can alert the user (e.g., via a voice alert or an application on a smart phone or smart watch) to the fact that he/she has different volume preferences in that environment. At this time the user may be given the option of listening to each of the settings and selecting the one that he/she would like to select as the default setting for that environment. Further, the user can be given the option of discarding the other settings and/or store the default settings, such as in storage device 338.

These methods can be performed by the hearing device such as hearing device 302, for example, using a series of voice prompts and the user on the hearing device. They can also be performed in external device such as external device 220

Figure 11:
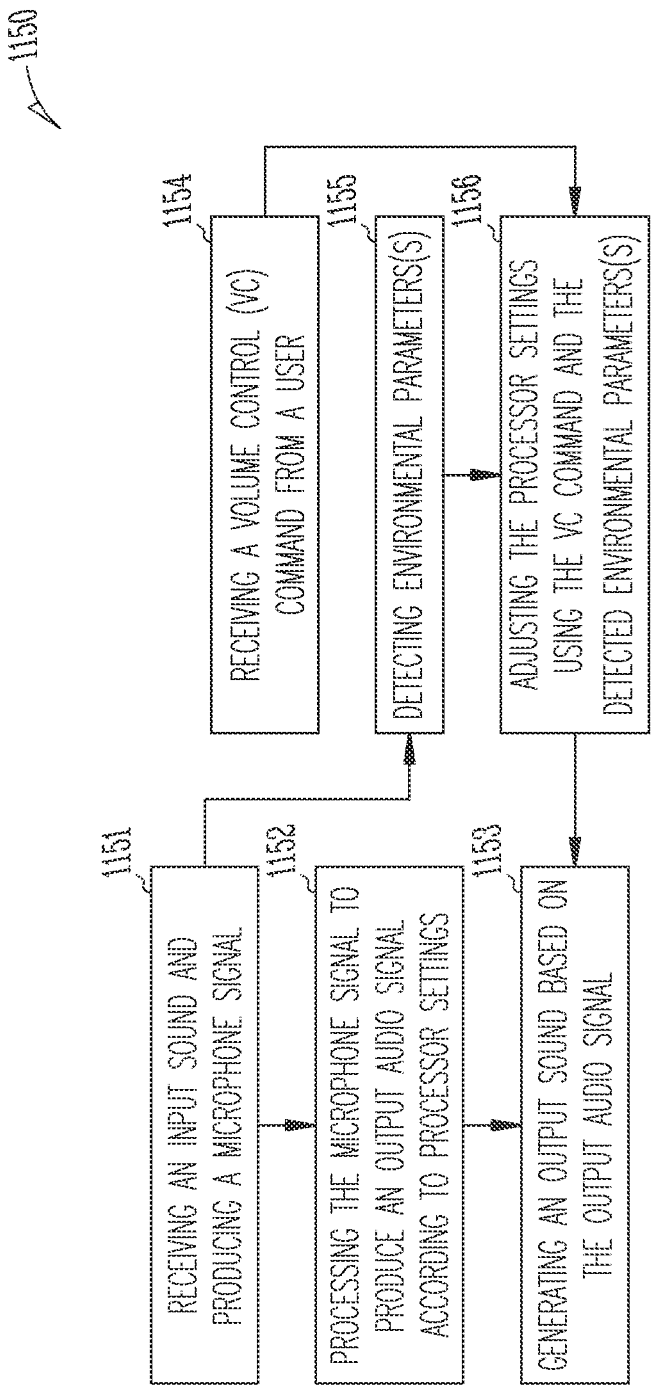
FIG. 11 is a flow chart illustrating an exemplary embodiment of a method for operating a user-adjustable hearing device.

FIG. 11 is a flow chart illustrating an exemplary embodiment of a method 1150 for operating a user-adjustable hearing device, such as hearing device 202.

At 1151, an input sound is received by a microphone of the hearing device. A microphone signal representative of the input sound is produced by the microphone. At 1152, the microphone signal is processed to produce an output audio signal using a processor of the hearing device according to a plurality of processor settings. At 1153, an output sound is generated based on the output audio signal using a speaker of the hearing device.

At 1154, a volume control (VC) command is received from the user. At 1155, one or more environmental parameters are detected using the microphone signal upon receiving the VC command. The one or more environmental parameters characterize the input sound at the time when the VC command is received, and include at least a level of the input sound. Examples of other one or more environmental parameters can include an estimate of the SNR of the input signal, ITDs (for binaural hearing devices), ILDs (for binaural hearing devices), a classification of the input sound (also referred to as an environmental classification), and a geographic location of the hearing device. At 1156, one or more processor settings of the plurality of processor settings are adjusted to control signals substantially characteristic of the detected one or more environmental parameters using the VC command and the detected one or more environmental parameters. Examples of the one or more processor settings include a gain, a compression ratio, and a frequency response.

In various embodiments, the one or more environmental parameters are detected at 1155 for specific frequency ranges selected from frequency ranges corresponding to a plurality of frequency channels of the processor, and the one or more processor settings are adjusted at 1156 for one or more frequency channels selected from the plurality of frequency channels. In various embodiments, the one or more processor settings are adjusted by selecting an input/output (I/O) curve from a plurality of I/O curves. The I/O curves are representative of gains being a ratio of the output level to the input level for various input levels for various environmental classifications.

Figure 12:
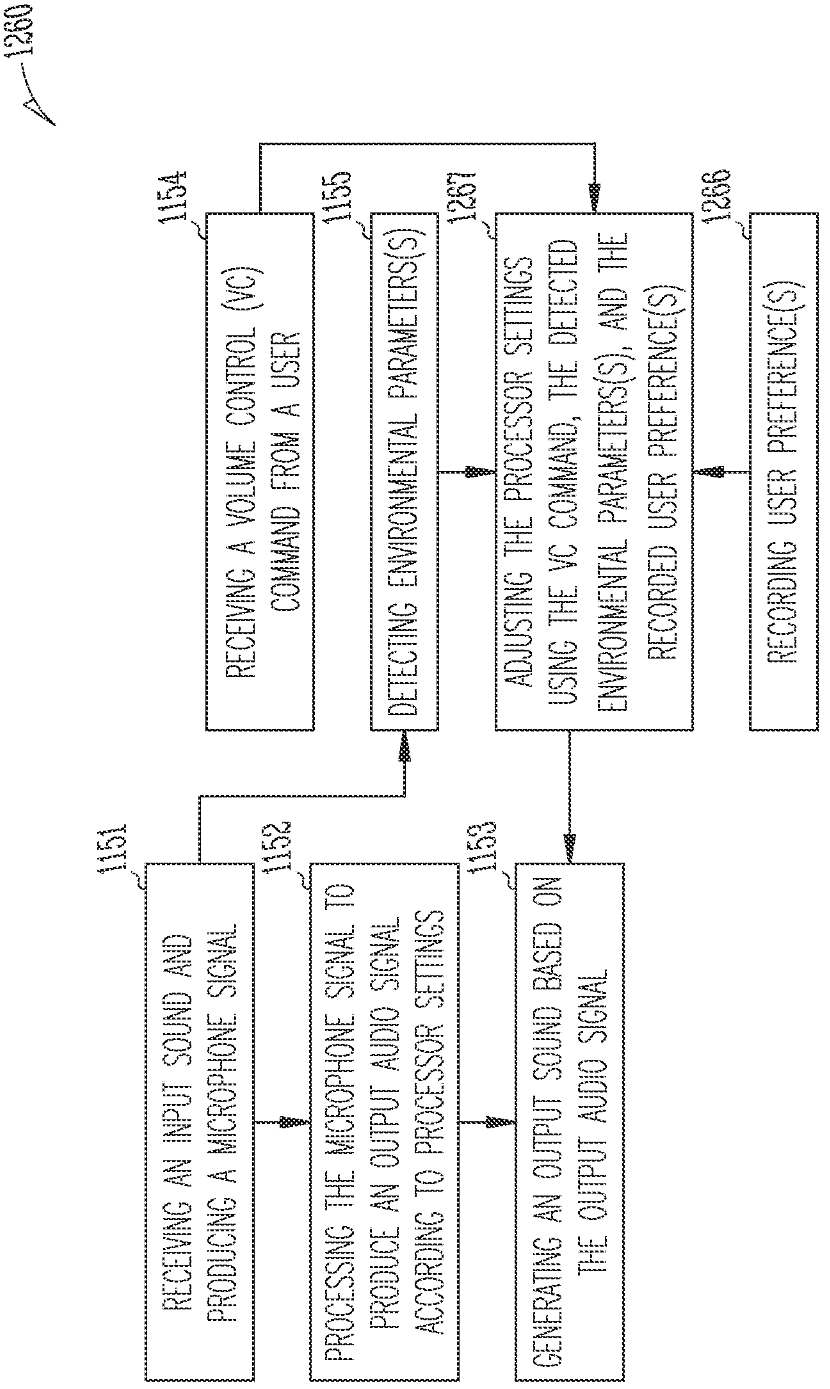
FIG. 12 is a flow chart illustrating another exemplary embodiment of the method for operating the user-adjustable hearing device.

FIG. 12 is a flow chart illustrating an exemplary embodiment of a method 1260 for operating the user-adjustable hearing device, such as hearing device 302.

Method 1260 include steps 1151, 1162, 1153, and 1154 of method 1150. At 1266, one or more user preferences for the output sound are recorded. The one or more user preference can be received explicitly from the user (e.g., via an application on a smart phone or smart watch), received implicitly from the user (e.g., through use of biological sensors such as an EEG sensor), and/or learned by executing a machine learning program over time when the hearing device is used and adjusted by the user. At 1267, one or more processor settings are adjusted using at least the VC command, the detected one or more environmental parameters, and the one or more user preferences for the output sound.

The present subject matter provides a simple user interface for adjusting one or more settings of a hearing device in response to receiving a VC command from the user of the hearing device. In various embodiments, the one or more settings can include the gain, the CR, and the frequency response of the hearing device. In various embodiments, knowledge about sound environments and user preferences can be used to determine how the one or more settings are adjusted.

In various embodiments, the present subject matter provides for settings adjustments by responding only to changes that the user makes to his/her hearing device. Each time when the hearing device is powered off/on, the gain settings revert to their original or default settings. In some embodiment, the hearing device can learn the user's preferred gain settings in certain acoustic environments (e.g., geographic locations) or for certain acoustic sound classes over time. In this document, preferred "gains" are referenced; however, it would be equally valid to learn VC offsets from a default setting or the final overall preferred output level in an environment, as long as the hearing device stores sufficient data to determine the final gain values that should be applied to a given input signal. For example, if the default gain in a frequency channel is 20 dB, and the volume is increased by 3 dB, then the final gain value is 23 dB. Whether the hearing device learns (and stores) the 3 dB or the 23 dB does not matter because either can be calculated based on knowledge of the other two values. Similarly, the hearing device can just as well learn the desired final output level (e.g. 83 dB sound pressure level (SPL)) for a given input level (e.g. 60 dB SPL), environmental class, and frequency channel. With this information, the preferred amount of gain (23 dB) could be calculated.

In various embodiments in which the hearing device can learn the user's gain and CR preferences in different environments over time, the learned settings for these environments can be accessed and modified by a hearing professional using professional fitting software or by the hearing aid wearer using a remote control or an application on a smart phone and/or smart watch. In the latter case, the user may have access to all, or a subset of, the parameters that are available to the hearing professional.

In various embodiments, different logic may be applied if the user is undoing a change he/she just made to the VC than if he/she is making a new change to the VC. This may be necessary when assumptions underlying the gain changes are different when the user increases the volume than when he/she decreases the volume. Differences in assumptions may lead to the gain being differentially adjusted in different frequency channels. For example, if the user turns the volume down, an assumption may be that the sound is too loud or too annoying, and volume within certain frequency regions may be turned down more than others. Similarly, if the user turns the volume up, an assumption may be that he/she wants better audibility, speech intelligibility or sound quality, and this may lead to volume within some frequency regions being turned up more than others. However, if the user adjusts the volume in one direction, and then within a short period of time adjusts the volume in the opposite direction, it may be better to assume that the user just wants to undo the change that he/she just made. Therefore, to take this into consideration, an option may exist that assumes that if a volume change is made in the opposite direction within some pre-determined amount of time, the previous gain and compression change(s) should be undone in an amount proportional to the VC change that the user makes. The time period in which a VC change in the opposite direction is considered an "undo" may be an adjustable parameter in the hearing professional's fitting software or as an option for the user on a remote or smart phone/watch application.

In various embodiments, the present subject matter can function differently depending on the compression architecture of the hearing device. Because each hearing device may have multiple regions of expansion, compression and output limiting, logic will need to be incorporated into the present subject matter to constrain the amount by which the user is allowed to affect the gain at one input level without affecting the gain at other input levels. This can be necessary to ensure that the expansion and CRs are appropriate for the acoustic environment and that they do not have a negative impact on speech understanding or sound quality.

In various embodiments, geotagging (e.g., by the hearing aids, a smart phone, or other remote control) can be used to improve the performance of the machine learning algorithm. In various embodiments, the input signal received by a microphone remote from the hearing device (e.g., a microphone of an external device such as a smart phone, or a remote microphone) can be combined with the microphone signal of the hearing device to improve the environmental classification.

In various embodiments, certain analysis of acoustic signals captured by the microphone of the hearing device can be performed by an external device (e.g., a smart phone and/or smart watch). In various embodiments, the user preferences and/or calculation of the ideal compression curve for each frequency channel can be transmitted to and stored in an external device (e.g., a smart phone, a smart watch, a programmer, and/or a remote control), and transmitted wirelessly to the hearing device when needed. In various embodiments, if a smart phone, a smart watch and/or other external device are used, the user can supply additional information to the hearing device to be used in determining how to process the microphone signal. Such additional information can include, for example, type and/or location of each signal of interest in the user's environment, type and/or location of each signal that is undesirable in the user's environment, and the user's listening goals (e.g., decrease of annoyance, occlusion, muffledness, sharpness, and loudness; improvement of listening comfort, speech intelligibility, localization, sound quality, and spatial awareness). Such sound descriptors are known to be associated with specific shaping of the frequency response.

In various embodiments, a remote control or an application on a smart phone and/or a smart watch can be used to control the volume, particularly when there is no physical VC input on the hearing device. A VC input on the hearing device can be a rotary switch, capacitive sensor, push button, toggle switch, etc.

The present subject can be applied to hearing devices including, but not limited to, hearing aids for users suffering from substantial hearing loss, as well as PSAPs (personal sound amplification product) or hearable technology for users suffering from slight or no hearing loss, respectively.

Hearing devices typically include at least one enclosure or housing, a microphone, hearing device electronics including processing electronics, and a speaker or "receiver." Hearing devices may include a power source, such as a battery. In various embodiments, the battery may be rechargeable. In various embodiments, multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing device. In various embodiments the wireless communications can include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing devices that are configured to communicate with mobile phones. In such embodiments, the hearing device may be operable to perform one or more of the following: answer incoming calls, hang up on calls, and/or provide two way telephone communications. In various embodiments, the present subject matter is used in hearing devices configured to communicate with packet-based devices. In various embodiments, the present subject matter includes hearing devices configured to communicate with streaming audio devices. In various embodiments, the present subject matter includes hearing devices configured to communicate with Wi-Fi devices. In various embodiments, the present subject matter includes hearing devices capable of being controlled by remote control devices.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter may be employed in hearing devices, such as hearing aids, PSAPs, hearables, headsets, headphones, and similar hearing devices.

The present subject matter may be employed in hearing devices having additional sensors. Such sensors include, but are not limited to, magnetic field sensors, telecoils, temperature sensors, accelerometers and proximity sensors.

The present subject matter is demonstrated for hearing devices, including hearing aids, including but not limited to, behind-the-ear (BTE), in-the-ear (ITE), in-the-canal (ITC), receiver-in-canal (RIC), completely-in-the-canal (CIC), or invisible-in-the-canal (IIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices. The present subject matter can also be used in deep insertion devices having a transducer, such as a receiver or microphone. The present subject matter can be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device for delivering an output sound to a user, the hearing device comprising:

a microphone configured to receive an input sound and to produce a microphone signal representative of the received input sound;

a volume controller configured to receive a volume control (VC) command for controlling a volume of the output sound;

an audio processor configured to:

process the microphone signal to produce an output audio signal according to processor settings;

detect environmental parameters using the microphone signal, the environmental parameters including a level of the input sound and another parameter related to a characteristic of the input sound; and adjust the processor settings in response to the VC command based on the VC command and the detected environmental parameters; and a speaker configured to produce the output sound using the output audio signal.

2. The hearing device of claim 1, wherein the audio processor comprises a plurality of frequency channels configured for processing the microphone signal at a plurality of frequency ranges and is configured to adjust the processor settings for the plurality of frequency channels in response to the VC command based on the VC command and the detected environmental parameters.

3. The hearing device of claim 2, wherein the audio processor is configured to select a subset of the plurality of frequency channels based on the detected environmental parameters.

4. The hearing device of claim 3, wherein the audio processor is further configured to adjust a gain of each frequency channel of the subset of frequency channels based on the VC command and the detected environmental parameters.

5. The hearing device of claim 3, wherein the audio processor is further configured to adjust a compression ratio of each frequency channel of the subset of frequency channels based on the VC command and the detected environmental parameters.

6. The hearing device of claim 3, wherein the audio processor is configured to select the subset of the plurality of frequency channels based on a sound classification of the detected environment parameters.

7. The hearing device of claim 6, wherein the audio processor is configured to increase a gain for only the subset of the plurality of frequency channels in response to the level of the input sound being low and the sound classification being speech.

8. The hearing device of claim 1, wherein the audio processor is configured to adjust one or more settings of the processor settings for only soft sounds of the input sound when the level of the input sound is low, the soft sounds including sounds having the level of the input sound below a low threshold.

9. The hearing device of claim 1, wherein the audio processor is configured to adjust one or more settings of the processor settings for only loud sounds of the input sound when the level of the input sound is high, the soft sounds including sounds having the level of the input sound above a high threshold.

10. A method for operating a hearing device to deliver an output sound to a user, the method comprising:

receiving an input sound and producing a microphone signal representative of the input sound using a microphone of the hearing device;

receiving a volume control (VC) command for controlling a volume of the output sound;

processing the microphone signal using an audio processor of the hearing device according to processor settings;

detecting environmental parameters from the microphone signal, the environmental parameters including a level of the input sound and another parameter related to a characteristic of the input sound;

adjusting the processor settings in response to the VC command based on the VC command and the detected environmental parameters; and producing the output sound using the processed microphone signal using a speaker of the hearing device.

11. The method of claim 10, wherein detecting the environmental parameters comprises detecting the level of the input sound and a signal-to-noise ratio of the input sound.

12. The method of claim 10, wherein detecting the environmental parameters comprises detecting the level of the input sound and at least one of an interaural time difference or an interaural level difference.

13. The method of claim 10, wherein detecting the environmental parameters comprises detecting the level of the input sound and an environmental classification.

14. The method of claim 13, adjusting the processor settings in response to the VC command based on the VC command and the detected environmental parameters comprises prioritizing one or more frequency channels of a plurality of frequency channels of the audio processor based on the environmental classification.

15. The method of claim 10, wherein adjusting the processor settings in response to the VC command based on the VC command and the detected environmental parameters comprises:

selecting one or more frequency channels from a plurality of frequency channels of the audio processor; and adjusting one or more processor settings of the processor settings for the selected one or more frequency channels.

16. The method of claim 15, wherein selecting the one or more frequency channels from the plurality of frequency channels of the audio processor comprises selecting a subset of the plurality of frequency channels based on the detected environmental parameters.

17. The method of claim 16, wherein adjusting the one or more processor settings of the processor settings for the selected one or more frequency channels comprises adjusting a gain of each frequency channel of the subset of frequency channels based on the VC command and the detected environmental parameters.

18. The method of claim 16, wherein adjusting the one or more processor settings of the processor settings for the selected one or more frequency channels comprises adjusting a compression ratio of each frequency channel of the subset of frequency channels based on the VC command and the detected environmental parameters.

19. The method of claim 10, wherein adjusting the processor settings in response to the VC command based on the VC command and the detected environmental parameters comprises adjusting one or more settings of the processor settings for only soft sounds of the input sound when the level of the input sound is low, the soft sounds including sounds having the level of the input sound below a low threshold.

20. The method of claim 10, wherein adjusting the processor settings in response to the VC command based on the VC command and the detected environmental parameters comprises adjusting one or more settings of the processor settings for only loud sounds of the input sound when the level of the input sound is high, the soft sounds including sounds having the level of the input sound above a high threshold.

* * * * *